(12) United States Patent
Nikolic

(10) Patent No.: US 9,187,001 B2
(45) Date of Patent: Nov. 17, 2015

(54) ELECTROMAGNETIC BRAKING DEVICE

(71) Applicant: Zivota Nikolic, Benbrook, TX (US)

(72) Inventor: Zivota Nikolic, Benbrook, TX (US)

( * ) Notice: Subject to any disclaimer, the term of this patent is extended or adjusted under 35 U.S.C. 154(b) by 0 days.

(21) Appl. No.: 14/508,864

(22) Filed: Oct. 7, 2014

(65) Prior Publication Data

US 2015/0137525 A1    May 21, 2015

Related U.S. Application Data

(63) Continuation of application No. 13/223,175, filed on Aug. 31, 2011, now Pat. No. 8,853,869.

(60) Provisional application No. 61/378,645, filed on Aug. 31, 2010.

(51) Int. Cl.

| | | |
|---|---|---|
| *H02K 7/18* | (2006.01) | |
| *B60L 11/18* | (2006.01) | |
| *H02K 21/24* | (2006.01) | |
| *F16D 63/00* | (2006.01) | |
| *H02K 53/00* | (2006.01) | |
| *F16D 121/20* | (2012.01) | |

(52) U.S. Cl.
CPC ........... *B60L 11/1809* (2013.01); *F16D 63/002* (2013.01); *H02K 7/1846* (2013.01); *H02K 7/1869* (2013.01); *H02K 21/24* (2013.01); *F16D 2121/20* (2013.01); *H02K 53/00* (2013.01); *Y10S 74/09* (2013.01)

(58) Field of Classification Search
CPC ............... H02K 21/24; H02K 2213/12; F05B 2260/4031

USPC .......................................................... 290/1 R
See application file for complete search history.

(56) References Cited

U.S. PATENT DOCUMENTS

| | | | |
|---|---|---|---|
| 4,075,603 A | | 2/1978 | Snyder et al. |
| 4,536,668 A | | 8/1985 | Boyer |
| 4,539,497 A | | 9/1985 | Boyer |
| 5,753,987 A | | 5/1998 | Shepherd et al. |
| 7,226,018 B2 | * | 6/2007 | Sullivan ........................ 244/111 |
| 7,394,165 B2 | * | 7/2008 | Schiller ......................... 290/1 R |
| 7,403,103 B2 | | 7/2008 | Pearman |
| 7,579,705 B1 | * | 8/2009 | Ross ............................... 290/53 |
| 8,026,622 B2 | | 9/2011 | Thackston |
| 8,083,557 B2 | * | 12/2011 | Sullivan ........................... 440/6 |
| 8,338,977 B2 | * | 12/2012 | Lee et al. ........................ 290/44 |
| 2011/0025067 A1 | * | 2/2011 | Cipriani ......................... 290/52 |
| 2011/0042961 A1 | * | 2/2011 | Van Breemen-Schneider ....... 290/55 |

* cited by examiner

*Primary Examiner* — Tho D Ta

(74) *Attorney, Agent, or Firm* — Jack D. Stone, Jr., Esq.; Scheef & Stone, L.L.P.

(57) ABSTRACT

An electric generator includes a wheel coupled to an axle of a vehicle which includes battery. A rotator is fixedly mounted to the wheel and includes a series of magnets positioned so that the north pole of one magnet abuts the south pole of an adjacent magnet. A stator is rotatably mounted to the axle, and includes a mass positioned off-center from the axle for biasing the stator toward a position that is generally stationary relative to the vehicle. The stator further includes a plurality of electric coils for generating electric current when the rotator is moved relative to the stator and the magnetic field of each magnet passes through the plurality of electric coils, the coils being electrically coupled to each other and to the battery of the vehicle to transmit electric current generated from the plurality of coils to the battery.

1 Claim, 10 Drawing Sheets

ELECTROMAGNETIC BRAKING DEVICE

CROSS-REFERENCE TO RELATED APPLICATIONS

This application is a continuation of U.S. Pat. No. 8,853,869, formerly co-pending patent application Ser. No. 13/223,175, filed on Aug. 31, 2011, and issued on Oct. 7, 2014, and claims the benefit of U.S. Provisional Application No. 61/378,645, filed Aug. 31, 2010, both of which applications are hereby incorporated herein by reference, in their entirety.

TECHNICAL FIELD

The invention relates generally to electricity generation and, more particularly, to the generation of electricity in transportation environments.

BACKGROUND

Increasingly, methods of people and goods transportation are moving away from the use of the internal combustion engine and toward the use of electric motors. This change is due to several factors, including: increased fuel costs for internal combustion engines, polluting effects of internal combustion engines, and greater efficiency of electric motors. However, there are still barriers to the widespread use of electric vehicles. For instance, completely electric vehicles are often powered by onboard batteries that must be recharged when exhausted. The recharging time can be quite lengthy lasting anywhere from forty-five minutes to four hours or more.

The battery charge time can be decreased by building a dedicated charging station that can handle larger electricity loads at the location where the electric vehicle is typically garaged. However, building these stations can be cost prohibitive for an average consumer. Thus, the average U.S. consumer is limited to the 120 volt outlet currently in use in most U.S. homes. This means that the average consumer of an electric vehicle is stuck with longer charge times.

Another barrier to electric vehicle adoption is the limited range of electric vehicles between charges. Due to the size and weight of the batteries, the number of batteries that can be placed on any particular vehicle is limited. This limits the amount of electrical energy available to power the electric vehicle, thus limiting the range between charges. Many modern purely electric vehicles are limited to a range of two hundred to three hundred miles between charges. Hybrid vehicles, vehicles powered with both an internal combustion engine and an electric motor, are an attempt to overcome the range limitation. In the short term, hybrid vehicles provide a solution to the range limitation, allowing an electric vehicle to increase its range by refueling with conventional gasoline. However, over the long term, hybrid vehicles do not solve the problems, described above, faced by the use of internal combustion engines.

In a similar vein, efforts to convert the U.S. rail system from the use of polluting fossil fuels are stymied by the amount of electricity needed to move large loads long distances. Electric trains require a near continuous supply of electricity. This requirement limits the use of electric trains to environments where sufficient capital is available to build the electric infrastructure needed to supply continuous electricity. A desire to invest such capital does not presently exist outside of major metropolitan areas. Without a source of continuous electricity, an electric train must rely on batteries in the same way an electric vehicle would. The power needs of electric trains necessitate that an electric train carry batteries in such a large amount that the weight added to the electric train's load and the lengthy charge times make this an impractical option. Thus, the lack of an available electricity source stymies any efforts to produce and operate electric trains for people and goods transportation.

Therefore, it would be desirable for means of charging an electric vehicle and electric train while in use without the need for an internal combustion engine or dedicated outlet. The means for solving many of the above-described problems would preferably also provide an alternative mechanism for braking an electric vehicle.

SUMMARY

The present invention, accordingly, provides an electric generator including a wheel coupled to an axle of a vehicle which includes a battery. A rotator is fixedly mounted to the wheel such that the rotator rotates synchronously with the rotation of the wheel, the rotator including a series of magnets, each of the magnets defining a magnetic field, and each of the magnets being positioned so that the north pole of one magnet abuts the south pole of an adjacent magnet. A stator is rotatably mounted to the axle, the stator including a mass positioned off-center from the axle for biasing the stator toward a position that is generally stationary relative to the vehicle, the stator further including a plurality of electric coils for generating electric current when the rotator is moved relative to the stator and the magnetic field of each magnet passes through the plurality of electric coils, the coils being electrically coupled to each other and to the battery of the vehicle to transmit electric current generated from the plurality of coils to the battery.

The present invention also provides an electric generating mechanism comprising at least one drive wheel having gear teeth and at least one generator gear having gear teeth enmeshed with the gear teeth of the at least one drive wheel. The electric generating mechanism also comprises an axle coupled to each at least one generator gear and further coupled to a generator.

The present invention further provides an electromagnetic braking device comprising an axle, a first electromagnet proximate to the axle, and a second electromagnet proximate to the axle opposite the first electromagnet.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. Additionally, for the most part, details regarding basic automotive engineering, electrical generators, magnets, electromagnets, coils, stators, rotators, batteries, and the like have been omitted inasmuch as such details are not considered necessary to obtain a complete understanding of the present invention, and are considered to be within the skills of persons of ordinary skill in the relevant art.

Figure 1:
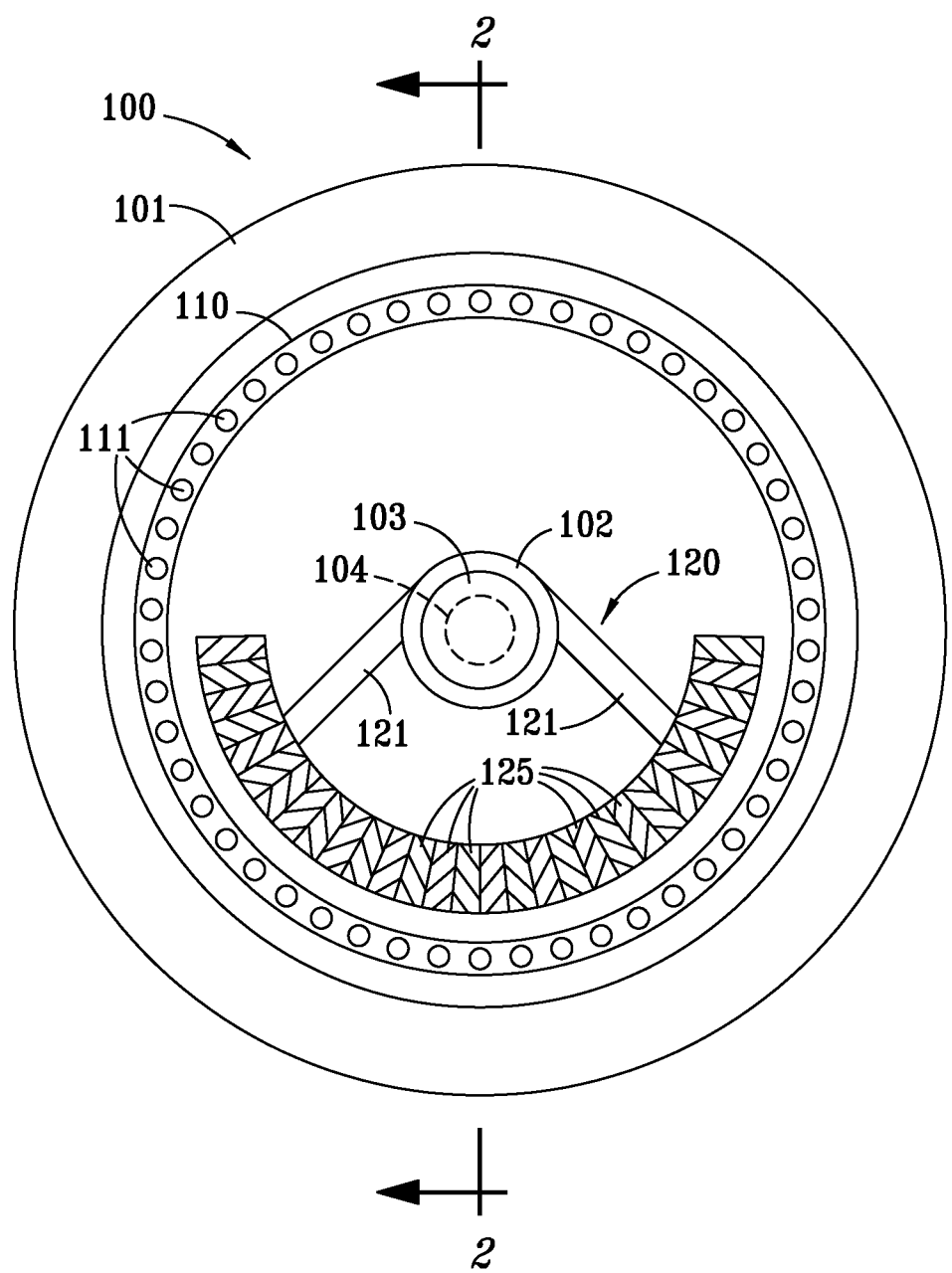
FIG. 1 exemplifies a front view of a generator embodying features of the present invention.
Figure 2:
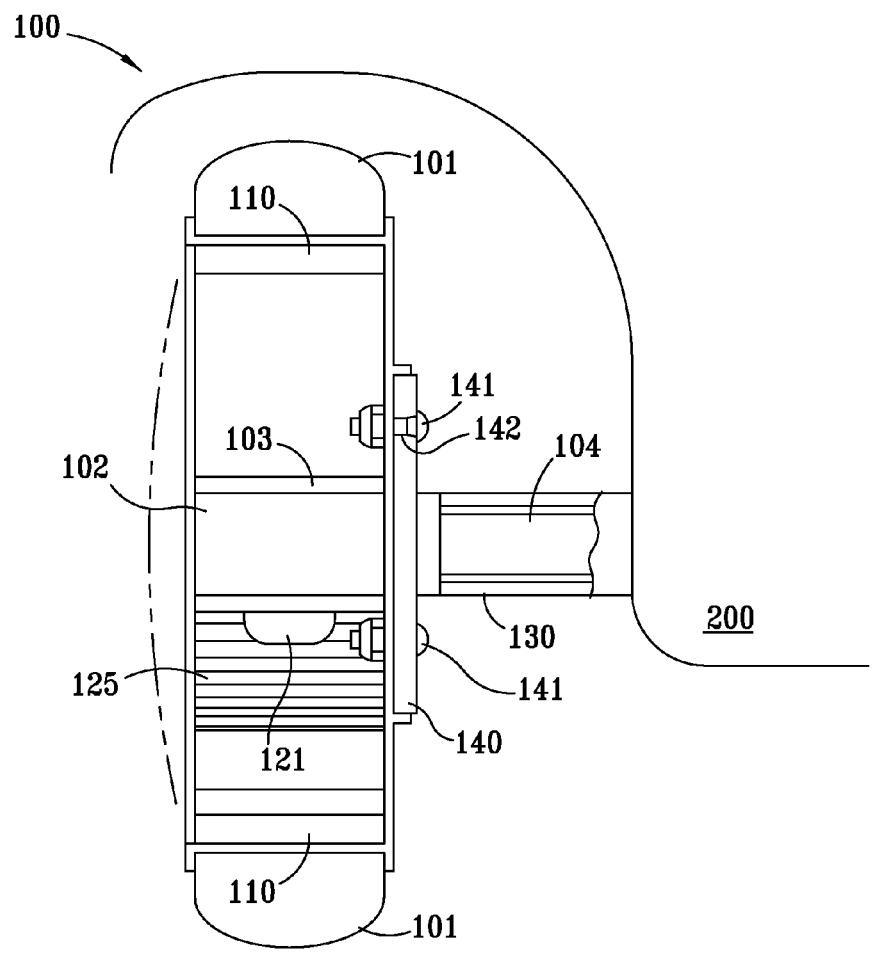
FIG. 2 illustrates a sectional view of the generator of FIG. 1, taken along the line 2-2 of FIG. 1.

Referring to FIG. 1, there is shown an electric generator 100 operated by the motion of a vehicle 200 (FIG. 2; e.g., an automobile, truck, train). In the illustrated embodiment, the electric generator 100 comprises a tire 101, a wheel/rotator 110, a stator 120, a stator mount 121, a wheel/rotator hub 102, and a fly bearing 103. In the preferred embodiment, the wheel/rotator 110 is a wheel suitable for mounting to an axle 104 (FIG. 2) such that an electric current generated by the wheel can be transmitted to a battery (not shown). A plurality of electric coils of wire, preferably copper wire, 111 are embedded in the wheel such that an electric current induced in the coils 111 may be transmitted through the wheel/rotator 110 through the axle 104 to a battery (not shown). In a preferred embodiment, the number of coils 111 is a multiple of four, and every fourth coil is coupled together (not shown) to generate four-phase electric current in a manner well known to those skilled in the art; it is understood that the number of coils and phases may vary from four.

The stator 120 is coupled to the axle 104 through the stator mounts 121. The stator 120 is of a size and shape such that it will fit within the circular area defined by the wheel/rotator 110 and, in accordance with the present embodiment, extends through an arc of less than a full circle, such as a semi-circle, so that, as depicted by FIG. 1, it is biased by gravity to a generally stationary position relative to the vehicle 200 (FIG. 2). A person of ordinary skill in the art will understand that the stator 120 may be of a size and shape as illustrated in FIG. 1, or alternatively may comprise any size and shape such that the wheel/rotator 110 may rotate around the stator 120. The stator mounts 121 couple to the fly bearing 103 allowing the axle 104 to operate in a conventional manner, and allowing the wheel/rotator 110 to rotate about the wheel/rotator hub 102, leaving the stator 120 relatively stationary relative to the vehicle 200 (FIG. 2). In the preferred embodiment, the stator 120 comprises a plurality of natural magnets 125 oriented so that the north and south poles of each magnet alternates with the magnet adjacent to it, so that the north pole of each magnet abuts the south pole of each magnet adjacent to it. The magnets 125 preferably generate a magnetic field of sufficient strength such that rotation of the coils 111 in the wheel/rotator 110 around the stator 120 induces an electric current in the coils 111.

Figure 3:
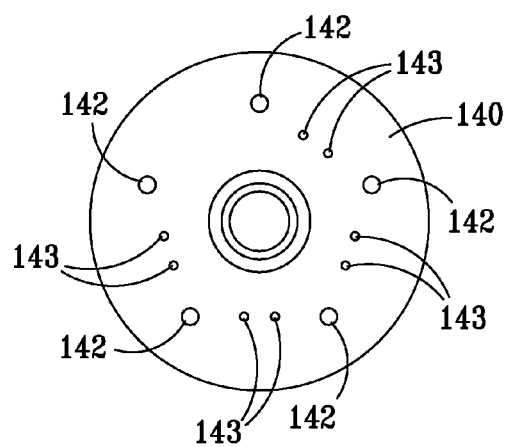
FIG. 3 illustrates a drive shaft plate used in conjunction with the generator of FIG. 1.

Referring now to FIG. 2, there is shown a sectional view of the electric generator of FIG. 1 taken along line 2-2 of FIG. 1. FIG. 2 illustrates the electric generator 100 coupled to an electric vehicle 200, through the axle 104. The electric generator 100 comprises the elements shown and described above with respect to FIG. 1, as well as a drive shaft plate 140 and optionally a conductive washer 130 In an optional embodiment, the electric generator 100 preferably couples to the axle 104 by means of a nut secured over the wheel/rotator hub 102 and by means of bolts 141 (two of which are shown) passing through a back of the electric generator 100 and through drive shaft plate openings 142 (five of which are shown in FIG. 3) in the drive shaft plate 140. Preferably, the bolts 141 are spaced to ensure appropriate alignment of electric adapters in the electric generator 100 carrying current induced in the coils 111, through electric connector holes 143 (FIG. 3). This allows electric current induced in the coils 111 to transmit from the electric generator 100 through the electrical adapters (not shown), through the drive shaft plate 140, through the conductive washer 130 along the axle 104 and into the electric vehicle 200 where it recharges a battery (not shown). The spacing of the drive shaft plate openings 142, through which the bolts 141 pass, prevent a user from misaligning the electric generator 100 and damaging the electric generator 100 during the process of coupling the electric generator 100 to an electric vehicle 200.

In operation, when the electric vehicle 200 moves, the tire 101, and the wheel/rotator 110 rotate about the wheel/rotator hub 102. This rotation causes the coils 111 to pass through the magnetic fields generated by the magnets 125 of the stator 120. This induces an electric current in the coils 111 that transmits from the wheel/rotator 110 through the conductive washer 130, through the axle 104, and to a battery (not shown), thus recharging the battery. In this manner, an electric vehicle 200 is constantly under recharge during the operation of the vehicle. Further, it is noted that while the vehicle 200 is moving at a relatively constant speed, the stator 120 remains in a relatively stationary position with respect to the vehicle 200. However, as the vehicle 200 is accelerated, the coils 111 will tend to "pull" the stator 120 rearwardly with it, which will reduce drag from the generator 100 on the vehicle 200 during acceleration, thereby enabling the vehicle to accelerate better. Due to the tendency of the stator 120 to rotate during acceleration, the stator 120 should comprise sufficient mass to prevent it from rotating 360° or more during the most extreme acceleration. The design of the stator 120 to comprise such sufficient mass is a function of many variables, all of which are considered to be within the capabilities of a person skilled in the art, and therefore will be discussed in further detail herein.

It may be appreciated that the generation of electricity from the generator 100 results in a decrease in the rate of drain on the electric vehicle's 200 battery, thereby increasing the electric vehicle's 200 range, and decreasing the amount of recharge time needed between electric vehicle 200 uses. Thus, a U.S. consumer is freed from the problems associated with fossil fuels without being subjected to the traditionally long charge times, short ranges, and expensive home infrastructure usually associated with electric vehicles.

In the discussion of the following FIGS. 4-11, certain nomenclature will used in conjunction with the reference numerals to refer to the same or similar components. Specifically, reference numerals ending in 10 will be used to designate a rotator, reference numerals ending in 11 will be used to designate coils, reference numerals ending in 20 will be used to designate a stator, reference numerals ending in 21 will be used to designate a spokes, reference numerals ending in 25 will be used to designate magnets, and reference numerals ending in 30 will be used to designate mass used for weight. Furthermore, in the interest of conciseness, details regarding the components designated as such, that have previously been discuss in some detail, as with respect to FIGS. 1-3, will not again be discussed in such detail for each succeeding presentation of same, as such would be considered to be cumulative and understood by a person skilled in the art.

Figure 4:
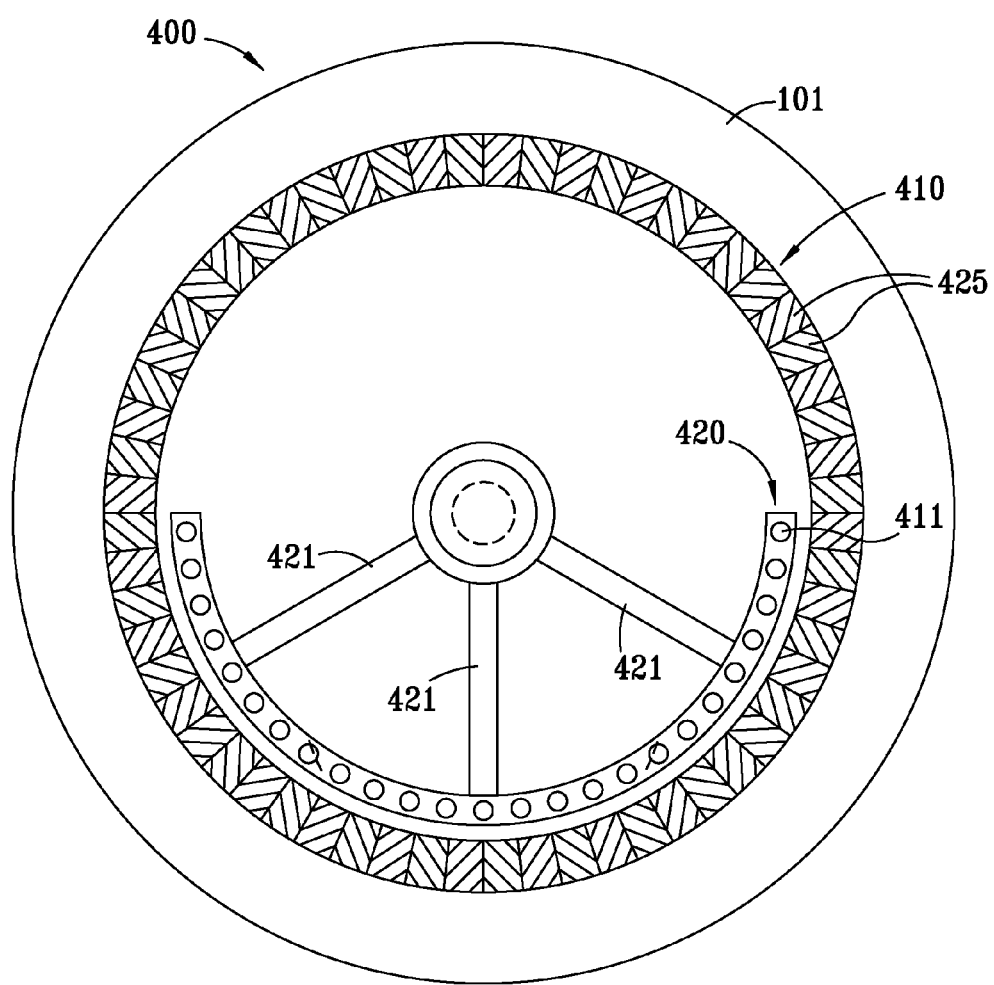
FIG. 4 exemplifies an alternate embodiment of a generator embodying features of the present invention.

Referring now to FIG. 4, an electric generator 400 is depicted similar to the generator 100 (FIGS. 1-3), but for reversing the placement of the coils and magnets. More specifically, coils 411 are positioned on a stator 420, and a plurality of magnets 425 are positioned on a rotator 410. Operation of the generator 400 is similar to operation of the generator 100, except that electric current is drawn from the stator instead of the rotator.

Figure 5:
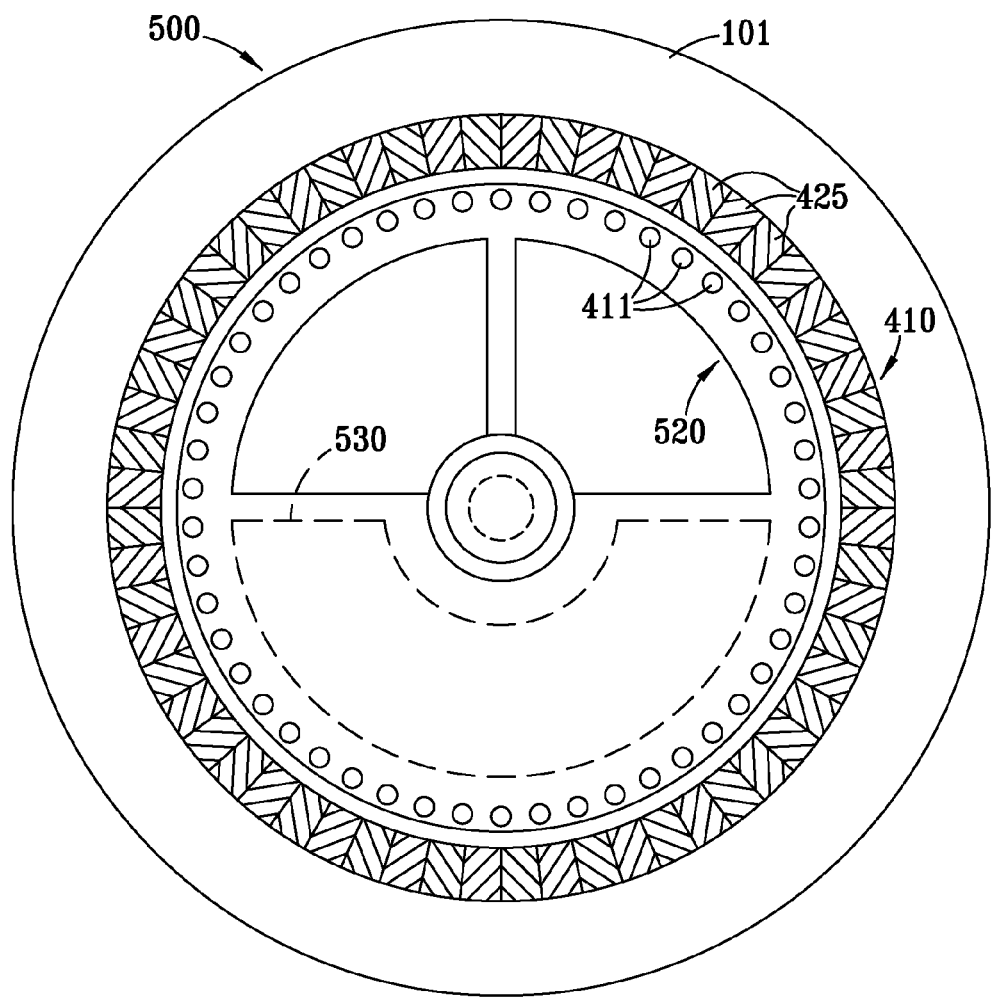
FIG. 5 exemplifies a second alternate embodiment of a generator embodying features of the present invention.

In FIG. 5, an alternate embodiment of the invention is depicted, similar to the embodiment of FIG. 4, but for the stator 520 extending through an arc of a full circle. A bias of the stator 520 to a generally stationary position relative to the vehicle 200 is obtained by configuring the stator with additional mass 530 on a lower side thereof. Otherwise, the stator 520 includes a plurality of coils 511, and the rotator 510 includes a plurality of magnets 525, oriented with alternating polarities. Operation of the generator 500 is similar to that discussed above with respect to the generator 400 of FIG. 4.

Figure 6:
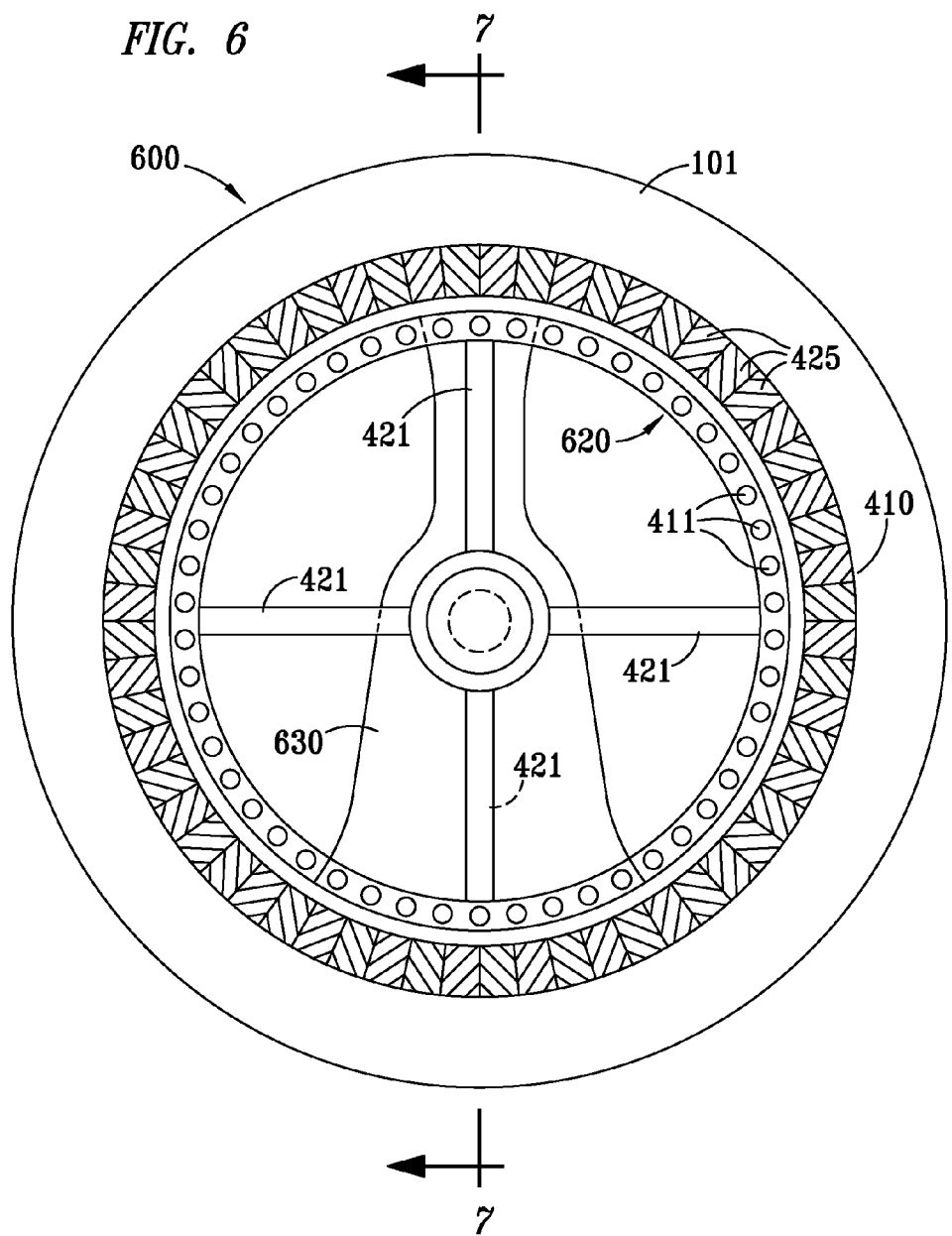
FIG. 6 exemplifies a third alternate embodiment of a generator embodying features of the present invention.
Figure 7:
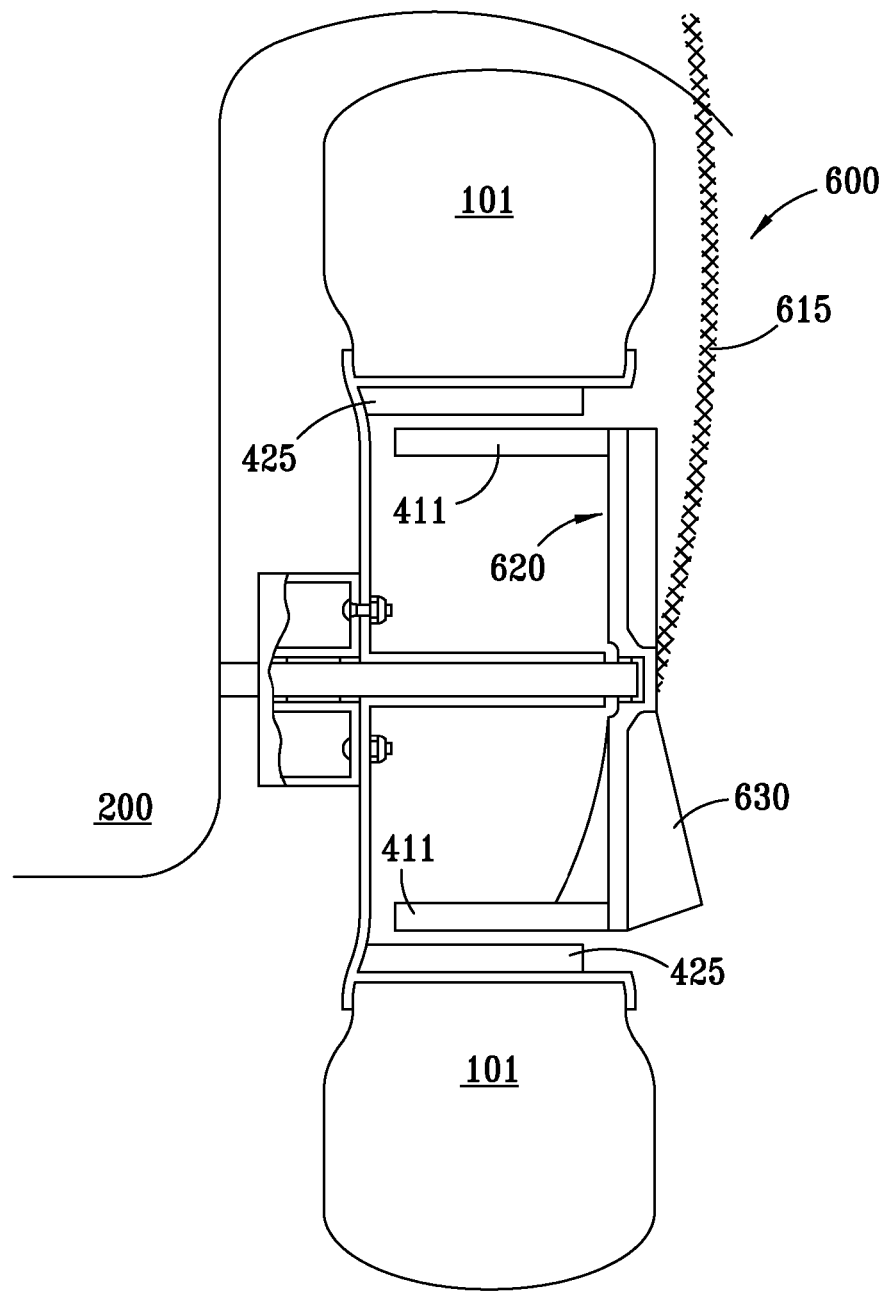
FIG. 7 is a cross-sectional view of the generator of FIG. 6 taken along the line 7-7 of FIG. 6.

In FIGS. 6 and 7, an alternate embodiment 600 of the invention is depicted, similar to the generator of FIG. 4, but for bias of the stator 620 to a generally stationary position relative to the vehicle 200. The bias for the stator 620 is obtained by configuring the stator 620 with additional mass 630 on a lower side thereof. Conduit 615 carries electrical current from the stator 620 to a battery (not shown). Operation of the generator 600 is similar to that discussed above with respect to the generator 500 of FIG. 5.

Figure 8:
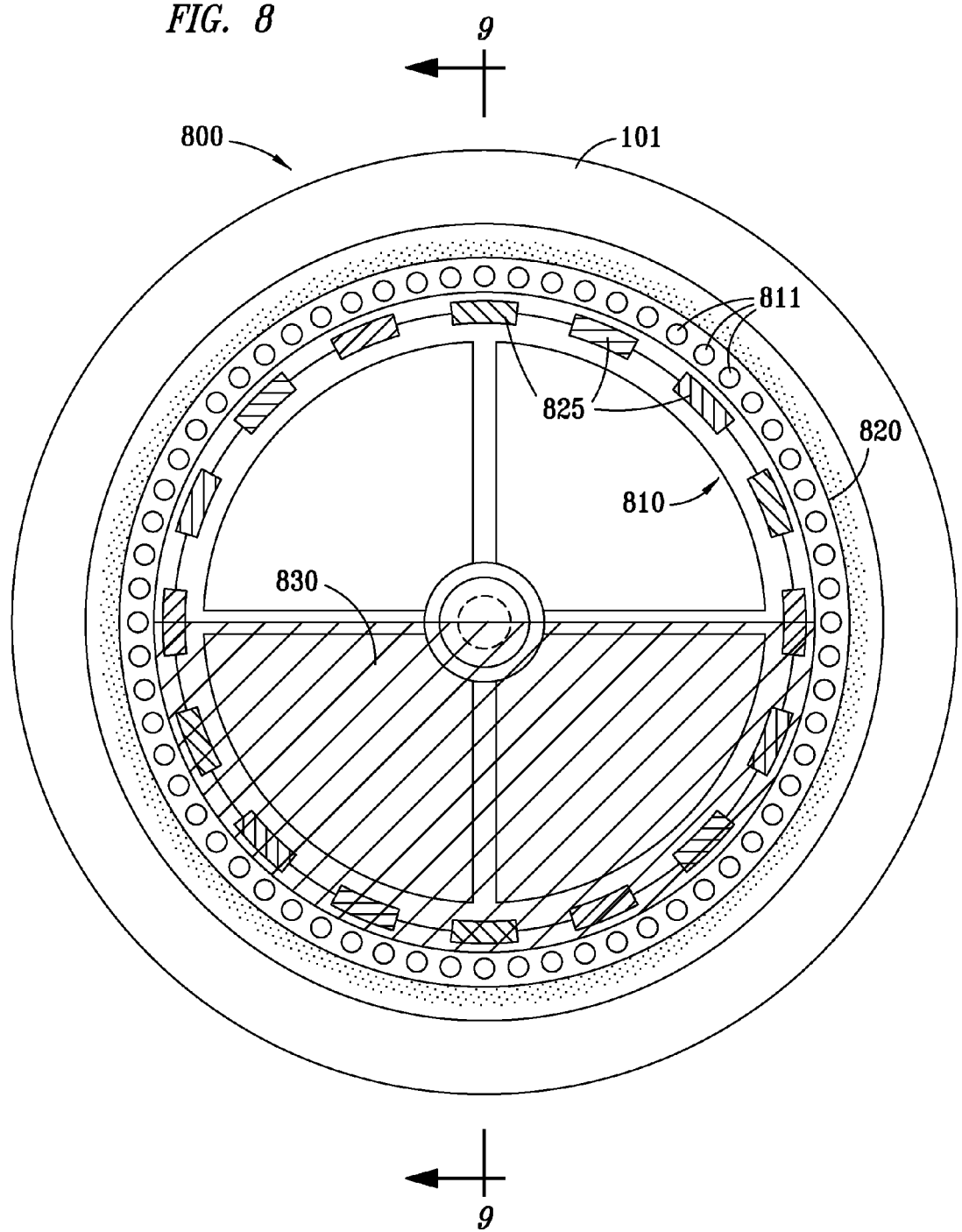
FIG. 8 exemplifies a fourth alternate embodiment of a generator embodying features of the present invention.
Figure 9:
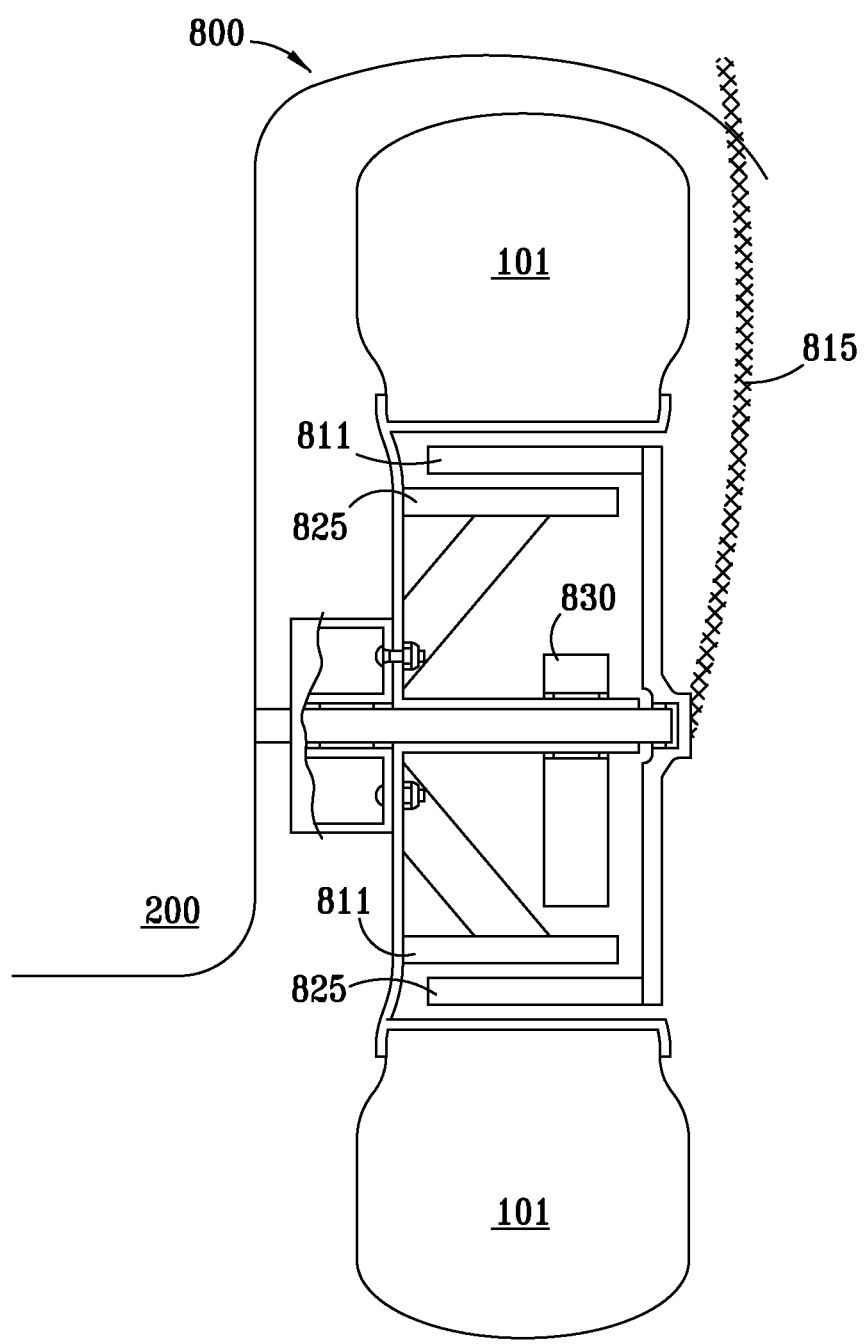
FIG. 9 is a cross-sectional view of the generator of FIG. 8 taken along the line 9-9 of FIG. 8.

In FIGS. 8 and 9, an alternate embodiment 800 of the invention is depicted, similar to the generator 600 of FIGS. 6 and 7, but for the rotator 810 being positioned within the stator 820 (instead of the stator being positioned within the rotator). The stator 820 is biased to a generally stationary position relative to the vehicle 200 by way of weight 830 occupying a lower position with respect to the wheel 101. Conduit 815 carries electrical current from the stator 620 to a battery (not shown). Operation of the generator 600 is similar to that discussed above with respect to the generator 600 of FIGS. 6 and 7.

Figure 10:
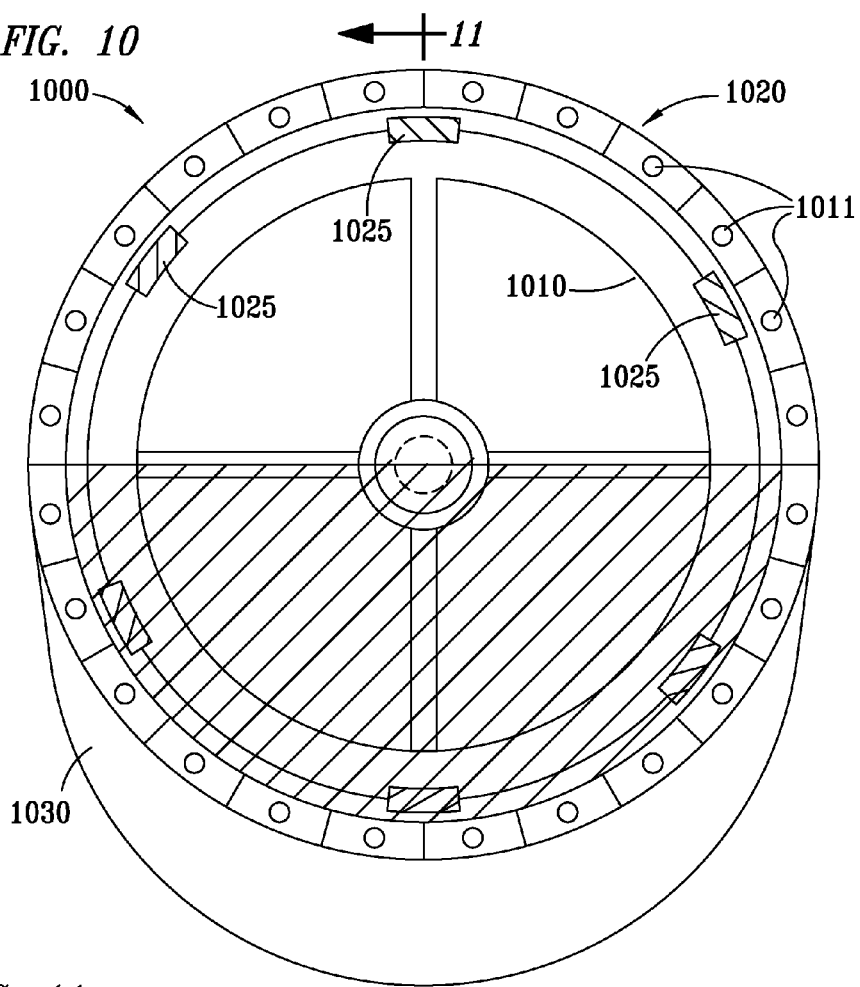
FIG. 10 exemplifies a fifth alternate embodiment of a generator embodying features of the present invention.
Figure 11:
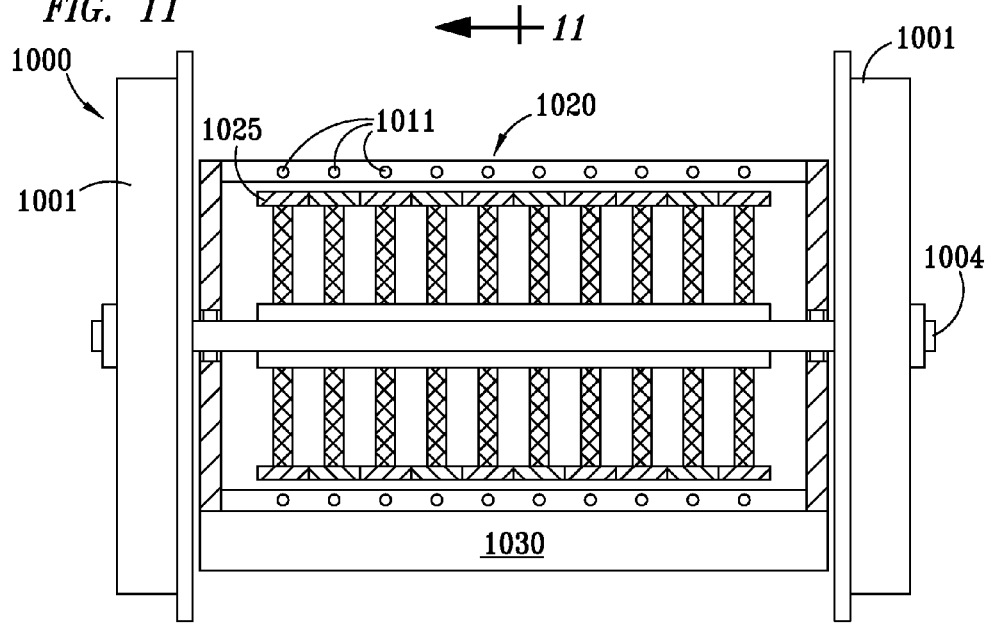
FIG. 11 is a cross-sectional view of the generator of FIG. 10 taken along the line 11-11 of FIG. 10.

With reference to FIGS. 10 and 11, there is depicted an embodiment of the present invention adapted for use on vehicles, such as railroad trains, trailers, semi-trailers, and stand-alone wheeled generators that are towed behind a vehicle primarily for the sole purpose of generating electricity, wherein the generating features of the present invention may be positioned substantially between the wheels rather than substantially within the wheels. Accordingly, a generator 1000 embodying features of the present invention is depicted in FIGS. 10 and 11, substantially similar to the generator 800 depicted by FIGS. 8 and 9, except for being positioned between wheels 1001 instead of within the wheels. As shown in FIG. 11, there are preferably multiple stators 1011 and rotators 1025 positioned along the axle 1004. The number of stators and rotators may be adjusted to allow for structural support of a train car above the axle. The stators 1101 are biased to a generally stationary position relative to the vehicle by way of weight 1130 occupying a lower position with respect to the wheels 1001. The embodiment shown in FIG. 11 may be adapted as a stand-alone trailer to a train, or may be adapted to axels on truck semi-trailers. A train may further be provided with one or more cars (now shown) that carry electrical energy storage devices, such as batteries, so that electrical energy may be accumulated and, if desired, dropped off and replaced at stopping points for use where electricity is needed, such as a power grid.

Figure 12:
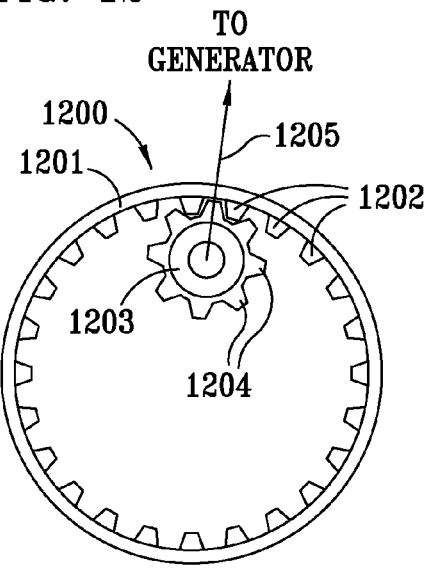
FIG. 12 exemplifies a device for transmitting power from a wheel to a generator in accordance with principles of the present invention.

Referring now to FIG. 12, there is shown a electricity generating mechanism 1200, preferably adapted for use with railroad trains, preferably electric railroad trains. The train electricity generating mechanism 1200 comprises a drive wheel 1201 having drive wheel gear teeth 1202 such that as the drive wheel 1201 turns, the drive wheel gear teeth 1202 do not inhibit the horizontal motion of the train. The train electricity generating mechanism 1200 further comprises a generator gear 1203 having generator gear teeth 1204 of a size and shape allowing the generator gear teeth 1204 to mesh with the drive wheel gear teeth 1202. The train electricity generating mechanism 1200 further comprises a generator axle 1205 coupled to the generator gear 1203 and further coupled to an electric generator (not shown). A person of ordinary skill in the art will understand a train may operate multiple electricity generating mechanisms 1200 to increase the amount of electricity that can be produced during operation. In addition, a person of ordinary skill in the art will understand that multiple generator gears 1203 may be enmeshed with the drive gear teeth 1202 of the drive wheel 1201, allowing for operation of multiple generators on each drive wheel 1201.

In operation, a train using an electric motor to generate power for horizontal motion will operate the train's electric motor to begin moving the train. The rotation of the drive wheel 1201 will cause the intermeshed drive wheel gear teeth 1202 to apply a rotational force to the generator gear teeth 1204. In response to the rotational force, the generator gear teeth 1204 will rotate the generator gear 1203. The generator axle 1205 coupled to the generator gear 1203 will rotate in response and rotate a rotator in a generator which in turn will recharge the train's batteries during operation. In the preferred embodiment, the gear ratio between the drive wheel 1201 and the generator gear 1203 will be such that the rotational speed of the generator gear 1203 during operation will be sufficient to operate the generator at the desired speed. In alternative embodiments, the generator axle 1205 will couple to a transmission that is in turn coupled to the generator allowing for further control of the operational speed of generator. Thus, an electric train can recharge its batteries during operation, increasing the range of the electric train without building significant electric train infrastructure over long distances.

Figure 13:
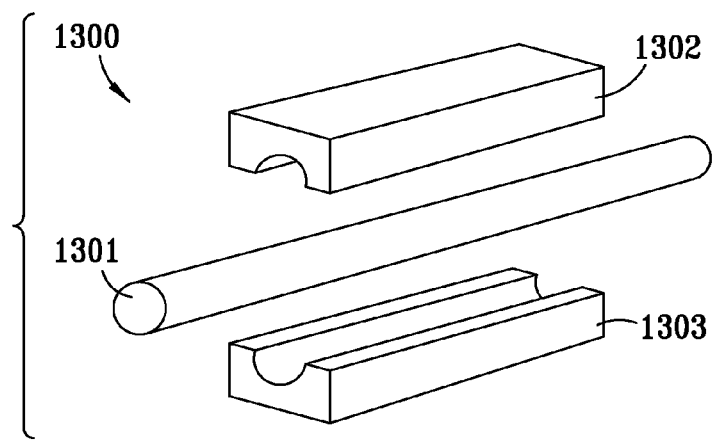
FIG. 13 is an exploded view exemplifying an electromagnetic brake in accordance with principles of the present invention.
Figure 14:
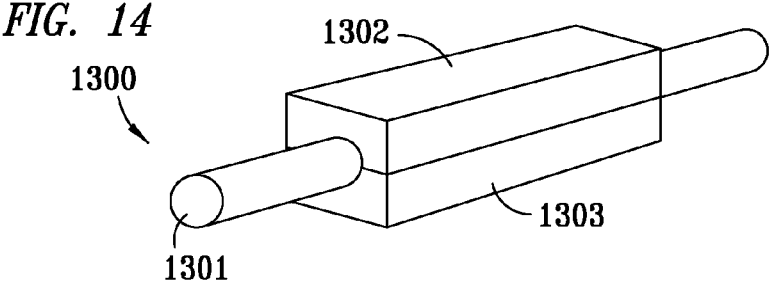
FIG. 14 depicts the brake of FIG. 13 in an assembled condition.

Referring now to FIGS. 13 and 14, there is shown an electromagnetic braking system 1300. The electromagnetic braking system 1300 comprises an axle 1301, a first electromagnet 1302, and a second electromagnet 1303. In the illustrated embodiment, the axle 1301 passes between the first electromagnet 1302 and the second electromagnet 1303, such that, at the point of highest braking, described below, the first electromagnet 1302 and the second electromagnet 1303 contact each other, and the axle 1301. At the point of least braking the first electromagnet 1302, the second electromagnet 1303, and the axle 1301 do not contact allowing the axle 1301 to rotate freely.

In operation, when no braking is desired the first electromagnet 1302 and the second electromagnet 1303 are not powered and do not inhibit rotation of the axle 1301 as shown in FIG. 13. When braking is desired, the first electromagnet 1302 and the second electromagnet 1303 are powered creating magnetic fields that draw the first electromagnet 1302 toward the second electromagnet 1303 into contact with the axle 1301 as shown in FIG. 14. As the electromagnets 402 and 403 come in contact with the axle 1301 the friction between the three components brings the axle 1301 to a stop, thus braking the object coupled to the axle 1301. Power is variably applied to the first electromagnet 1302 and the second electromagnet 1303 such that the rate of braking may be adjusted. Thus, traditional brakes of modern vehicles can be replaced with the braking mechanism of FIGS. 13 and 14 allowing use of any of the electric generators described above with respect to FIGS. 1-11.

It is understood that the present invention may take many forms and embodiments. Accordingly, several variations may be made in the foregoing without departing from the spirit or the scope of the invention. For example, the generator may comprise two discs facing each other, a first one of which discs would be fixedly mounted to the axle to rotate synchronously with the axle, and a second of which discs would be rotatbly mounted to the axle and would additionally include an off-center weight to bias the second disc to remain generally stationary relative to the vehicle. A series of magnets would be mounted with alternating poles to one disc, preferably the first disc, and a series of coils would be mounted to the other disc, preferably the second disc. The magnets and coils would thus be at substantially the same radial distance from the axle and, upon rotation of the axle, electric current would be generated from the coils.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An electromagnetic braking device comprising:
   an axle;
   a first electromagnet shaped to receive a first longitudinal portion of the axle;
   a second electromagnet shaped to receive a second longitudinal portion of the axle and opposing the first electromagnet so the axle is sandwiched between the first and second electromagnets, the first and second electromagnets being oriented to be magnetically attracted to each other in direct proportion to electrical power applied to the first and second electromagnets; and
   a controllably variable electrical power supply coupled the first and second electromagnets, the power supply being configured for controlling the power to the first and second electromagnets so that the more electrical power applied to the first and second electromagnets, the greater the compression and friction applied to the axle for braking the axle.

\* \* \* \* \*